June 22, 1937.　　F. G. WILLIAMSON　　2,084,662
AUTOMATIC SLACK ADJUSTER
Filed March 28, 1936　　3 Sheets-Sheet 1
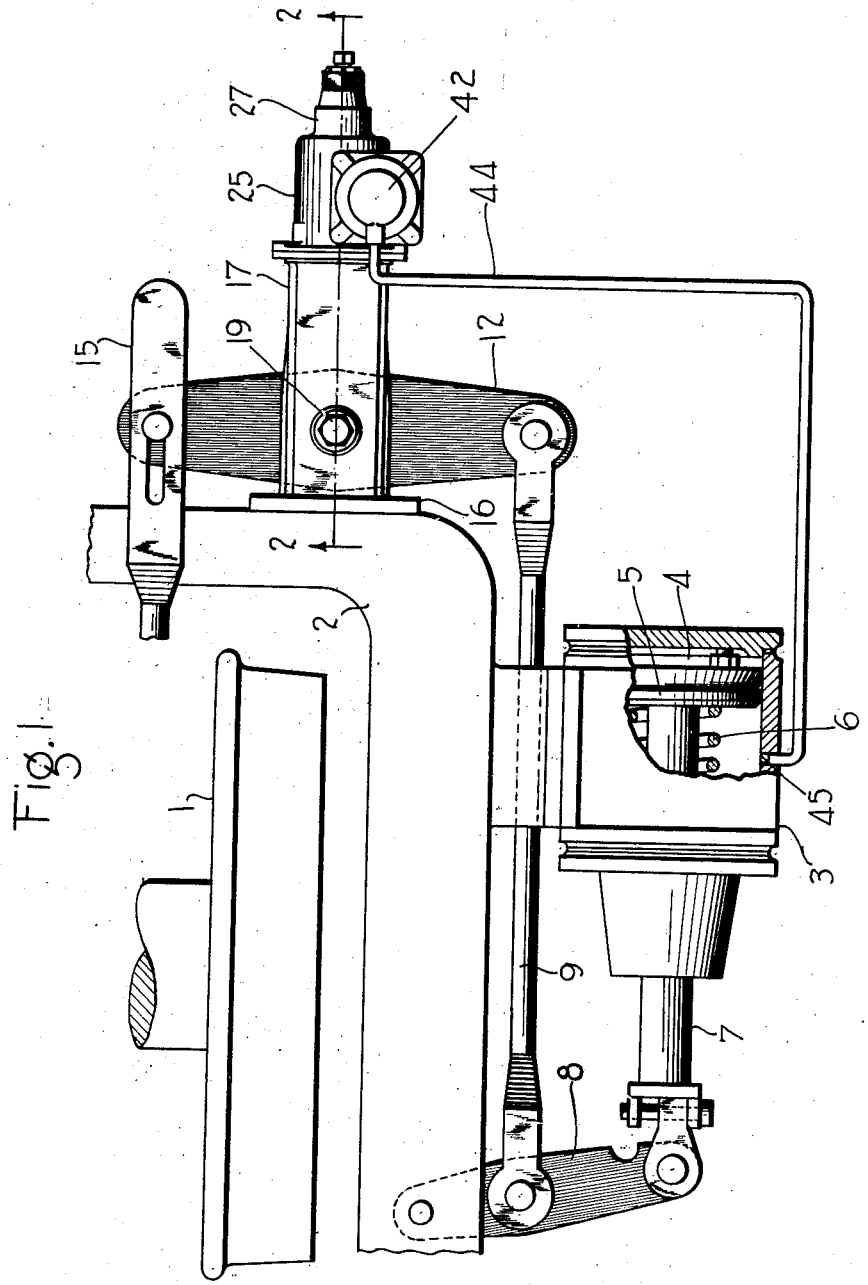
INVENTOR
FREDERICK G. WILLIAMSON
BY
ATTORNEY

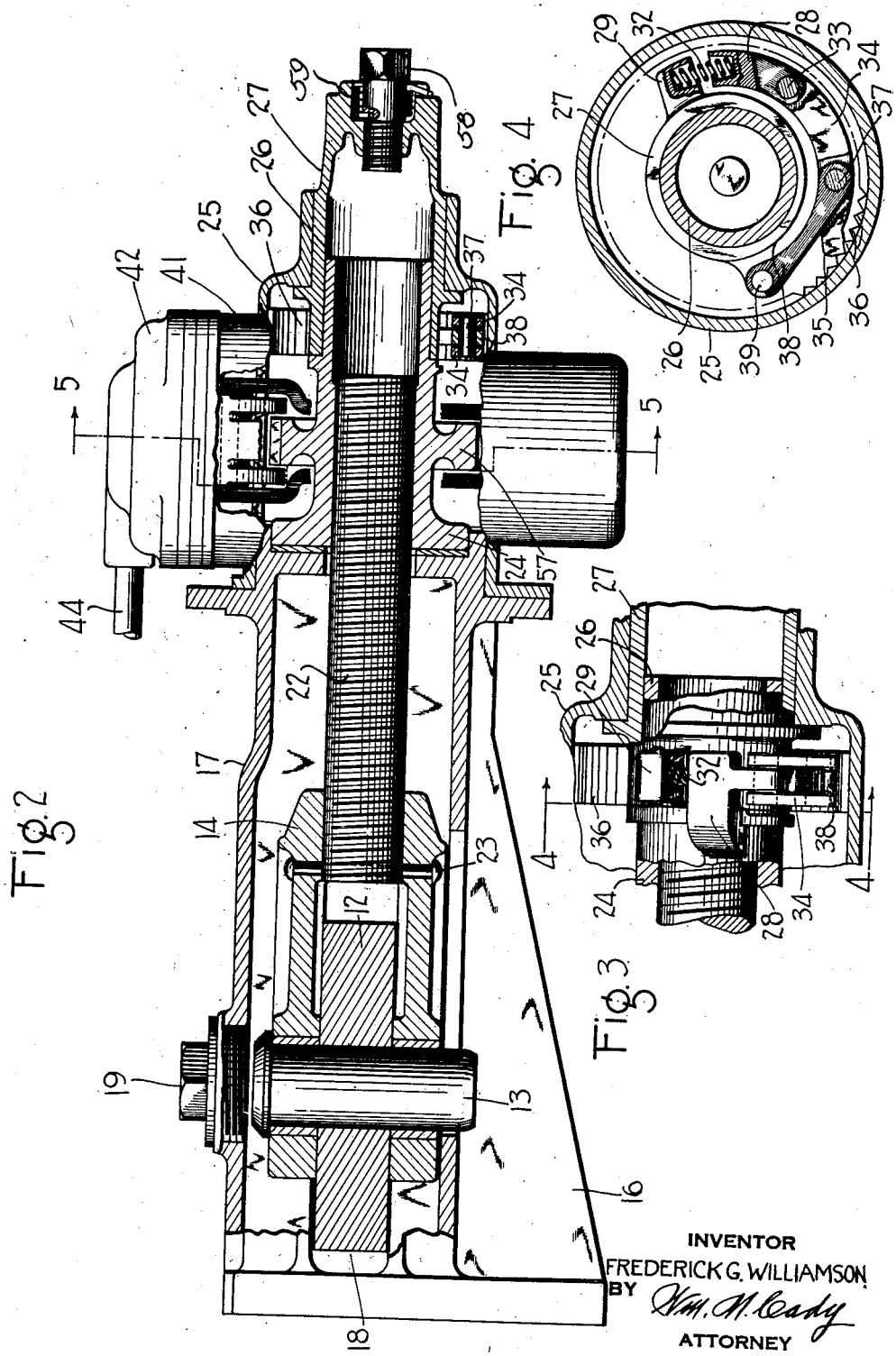

June 22, 1937.  F. G. WILLIAMSON  2,084,662
AUTOMATIC SLACK ADJUSTER
Filed March 28, 1936  3 Sheets-Sheet 3
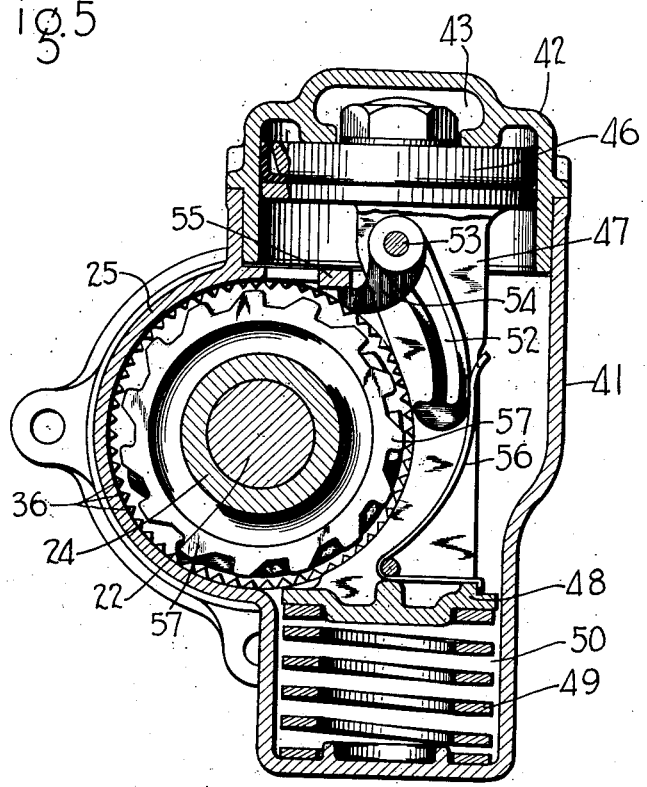
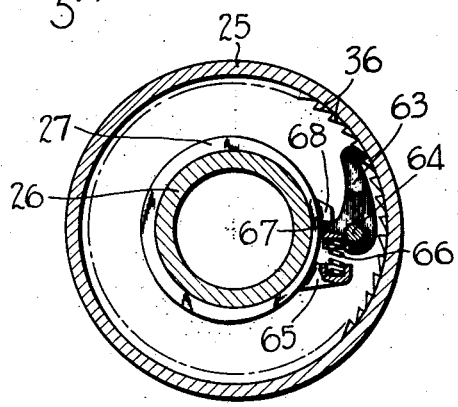
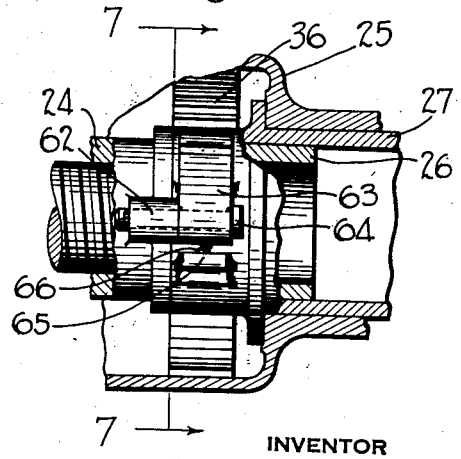
INVENTOR
FREDERICK G. WILLIAMSON
BY Wm. N. Cady
ATTORNEY Patented June 22, 1937

2,084,662

UNITED STATES PATENT OFFICE 2,084,662

AUTOMATIC SLACK ADJUSTER

Frederick G. Williamson, Wilkinsburg, Pa., assignor to The American Brake Company, Wilmerding, Pa., a corporation of Missouri Application March 28, 1936, Serial No. 71,460

10 Claims. (Cl. 188—203)

My invention relates to brake equipment for railway vehicles and more particularly to slack adjusting mechanism for vehicles employing fluid pressure brakes.

In many applications of fluid pressure brakes to railway vehicles it is desirable, in order to effect a compact braking unit, to mount the brake cylinders and slack adjusting mechanism directly on the car trucks instead of on the car body. Such mounting, however, subjects the parts to a considerable amount of shock caused by the vibration of the truck to which they are not subjected when this mechanism is mounted on the car body, since the car body is spring supported from the car truck. Because of the greater amount of vibration to which the slack adjusting mechanism is subjected when mounted on the car truck, there is a greater tendency for the ratchet nut to "back off" between slack adjustments of the mechanism thus disturbing an adjustment previously made. In installations where slack adjusters are mounted on the car body it has been customary to provide spring pressed check pawl arrangements for engaging the ratchet wheel which have been satisfactory for such service, but which are not sufficiently positive when the mechanism is submitted to the shock occasioned by mounting on a truck frame.

I am aware that it has been proposed to provide positive locking means that must be manually unlocked before the ratchet nut of the slack adjusting mechanism can be moved manually. Such devices, however, require special care in operation and are subject to destruction should a service man attempt to move the ratchet nut manually by means of a wrench without first unlocking the mechanism.

It is a general object of my invention to provide a slack adjusting mechanism for fluid pressure brake equipment that is sufficiently rugged to prevent changes in the adjustment of the mechanism that might be caused by vibration and that is at the same time readily adjustable manually.

It is a more specific object of my invention to provide a slack adjusting mechanism of the character described having a positive stop or latching mechanism thereon for locking the ratchet nut against backing off from an adjusted position until thrown out of engagement by the operator.

Other objects and advantages of my invention will be apparent from the following description of certain embodiments thereof, taken together with the accompanying drawings, in which Fig. 1 is a plan view showing one car wheel and a portion of the truck frame to which the brake cylinder and slack adjusting mechanism are mounted, Fig. 2 is a view, partly in section, along the line 2—2 of Fig. 1 showing the slack adjusting mechanism, Fig. 3 is a view partly in section and partly in perspective showing the ratchet nut and coupling mechanism, Fig. 4 is a sectional view taken along the lines 4—4 in Fig. 3, Fig. 5 is a vertical sectional view along the line 5—5 in Fig. 2.

Figs. 6 and 7 are views similar to Figs. 3 and 4, respectively, showing a modified form of the invention.

Referring to the drawings, and more particularly to Fig. 1, thereof, a railway car wheel 1 is illustrated that is mounted on a truck frame 2 in the usual way, a portion only of which is shown, and upon which truck a brake cylinder 3 is mounted providing a piston chamber 4 that is supplied with fluid under pressure in the usual manner to effect an application of the brakes, and which contains a piston 5 and a spring 6 for urging the piston 5, to its release position. The piston 5 is provided with a piston stem or rod 7 that extends through the non-pressure head of the brake cylinder and is suitably connected to one end of a horizontally disposed brake cylinder lever 8, the other end of which is attached to the truck frame 2, and to which, at an intermediate point, a pull rod 9 is connected. The other end of the pull rod 9 is connected by a pin to one end of an equalizing lever 12, fulcrumed on a pivot pin 13 (see Fig. 2) carried by a cross head 14 within the slack adjusting mechanism, and the outer end of which is connected to a pull rod 15, for effecting application of the brakes in a well known manner.

The slack adjuster body comprises a bracket 16 for mounting the adjusting mechanism on the car truck, and having a casing 17 in which is positioned the cross head 14, and which is provided with slots 18, through which the horizontally disposed equalizing lever 12 extends. An opening is provided in te upper wall of the casing 17, for effecting access to the fulcrum pin 13, the opening being normally closed by a cap nut 19.

One end of a screw threaded shaft 22 is attached to the cross head 14, by a pin 23 to hold the shaft against rotation, the other end extending through a hole in the casing 17, and being coupled to a ratchet nut 24 mounted within a casing 25 forming an extension of the casing 17. The outer end of the ratchet nut 24 terminates in a sleeve portion 26 positioned within a sleeve 27 of a ratchet nut extension member into which the shaft 22 is adapted to be moved by operation of the ratchet nut 24 to move the cross head 14 and the fulcrum pin 13 toward the right to take up slack in the brake mechanism.

The ratchet nut 24 and the ratchet nut extension 27 are coupled together as shown in Figs. 3 and 4, by means comprising a lug 28 that is integral with the ratchet nut 24, a latch 34 and a link 38. The lug 28 is connected to the latch member 34 by means of a pin 33, the other end of the latch member being provided with a squared end 35 that is adapted to engage teeth 36 on the wall of the casing 25. The mid point of the latch member is connected to a link member 38 by means of a pin 37, the other end of the link being connected by a pin 39 to a lug extending from the sleeve or ratchet nut extension member 27. A lug 29 is provided that is integral with the ratchet nut extension member 27, and is urged from the lug 28 by a spring 32, one end of which is contained in a recess in the lug 29, and the other end of which is contained in a recess in the lug 28.

Arranged transversely of the casing 17 is a casing 41 (see Fig. 5) having a cylinder 42 at one end thereof providing a piston chamber 43 that is connected by means of an adjuster pipe 44, to the brake cylinder through the slack adjuster port 45, (Fig. 1) through which fluid under pressure is supplied to the piston chamber 43 when the travel of the piston 5 is sufficient to uncover the port 45 upon the supply of fluid under pressure to the brake cylinder piston chamber 4.

A piston 46 is contained within the piston chamber 43 from which extends a piston stem 47 that may be in the form of parallel arms or brackets to the outer end of which is connected a plate 48 that is adapted to be engaged by one end of a spring 49 that is contained within a chamber 50 in the other end of the casing 41, for normally urging the piston 46 to its upper or illustrated position. A pawl 52 is pivotally connected to the stem 47 by means of a pin 53 and is provided with a lug 54 that is adapted to engage a stop member 55 when the piston is in its upper or illustrated position, to force the pawl 52 in a counterclockwise direction about the pin 53, against the force of a spring 56.

Upon application of the brakes, if the travel of a brake cylinder piston exceeds the normal amount desired, the piston will uncover the port 45 in the brake cylinder wall so that fluid under pressure will be supplied through the pipe 44 to the piston chamber 43 of the slack adjuster cylinder, and the piston 46 will be moved downwardly, the lug 54 disengaging the stop 55 and permitting the pawl 52 to be forced in a clockwise direction by the spring 56, so that the pawl engages the teeth of the ratchet wheel 57 formed integral with the ratchet nut 24. Upon the release of fluid under pressure from the brake cylinder and from the piston chamber 43, the pawl 52 will be moved upwardly by the spring 49 thus moving the ratchet wheel 57 in a counterclockwise direction as viewed in Fig. 5, to move the shaft 22 slightly toward the right as viewed in Fig. 2.

During this counterclockwise movement of the ratchet wheel 57, the latch and coupling mechanism illustrated in Figs. 3 and 4, will be correspondingly actuated, the lug 28 being moved toward the lug 29 against the force of the spring 32 sufficiently to permit the end 35 of the latch 34 to ride over the top of the teeth 36 to a new position. At the conclusion of the movement, however, the spring 32 forces the lug 29 together with the link 38 in a counterclockwise direction with respect to the lug 28, thus forcing the end 35 of the latch 34 outwardly against the wall of the casing 25, and causing it to engage one of the teeth 36 so that a clockwise movement thereof corresponding to a "backing off" action of the ratchet nut is prevented.

When it is desired to take up the slack manually the ratchet nut extension member 27 may be moved in a counterclockwise direction as viewed in Fig. 4. The movement of the sleeve 27 is communicated to the sleeve portion 26 of the ratchet nut 24 through pin 39, link 38, pin 37, latch 34, pin 33 and lug 28. It will be noted that the components of forces in this coupling construction are such that during manual operation the end 35 of the latch 34 is forced slightly outwardly into engagement with the teeth 36 so that as the end of the latch rides over the teeth it is continuously in engagement therewith to prevent a reverse movement of the sleeve 27.

If it is desired to back off the ratchet nut 24 to let out slack, the ratchet nut extension member 27 may be moved in a clockwise direction as viewed in Fig. 4, the link member 38 attached thereto by the pin 39 being effective to raise the latch member 34 so that the end 35 is drawn away from engagement with the teeth 36, thus permitting the member 27 and the ratchet nut 24 to be moved in a clockwise direction as viewed in Fig. 4, which is the reverse of the direction of motion caused by the pawl 52 of the slack adjuster mechanism.

It will be noted, therefore, that when force is applied to the coupling mechanism illustrated in Fig. 4, tending to move the mechanism in a clockwise direction, if it is applied to the lug 28, that is integral with the ratchet nut 24, the latch 35 is forced tightly into engagement with the teeth 36, thus preventing the lug 28 and the ratchet nut 24 from turning, while if this force is applied through the pin 39, the latch 35 is raised from engagement with the teeth 36, thus permitting the ratchet nut to be moved.

A stop screw 58 may be provided in the outer end of the sleeve 27 that is adapted to be engaged by the slack adjuster screw 22, and that is held in position by a spring 59 for a purpose more fully disclosed in my Patent 1,650,313, dated November 22, 1927, and assigned to the same assignee as this application.

A modified form of latch mechanism is illustrated in Figs. 6 and 7, and comprises a lug 62 formed integral with the sleeve portion 26 of the ratchet nut 24, and to which the latch 63 is pivotally mounted by a pin 64 in a position to engage the teeth 36 in the wall of the casing 25, to prevent a clockwise movement of the ratchet nut sleeve 26 as viewed in Fig. 7, so long as the latch is in engagement with the teeth 36. A lug 65 is formed on the ratchet nut extension sleeve 27, and is provided with a recess for accommodating one end of a spring 66, the other end of which terminates in a recess in the latch 63 for normally urging the latch in a clockwise direction about the pin 64 to cause engagement thereof with the teeth 36. A stop 68 is also provided on the sleeve 27 and is effective upon manual movement of the ratchet nut extension sleeve 37 in a clockwise direction to engage a lug 67 of the latch 63 to cause the latch to be withdrawn from engagement with the teeth 36 to permit movement of the sleeves 26 and 27 in a clockwise direction. It will be noted, therefore, that when force is applied to the latch 63 through the pin 64 tending to move it in a clockwise direction, the latch will remain in engagement with the teeth 36 to prevent such movement while if the force is applied through the stop member 68 of the ratchet nut extension member 27, the latch will be withdrawn from engagement with the teeth 36, permitting such movement.

It will be obvious to one skilled in the art that many modifications may be made within the spirit of my invention and I do not wish to be limited, otherwise than by the scope of the appended claims.

Having now described my invention, what I claim as new and desire to secure by Letters Patent, is:

1. In a brake slack adjuster, the combination with a ratchet wheel and pawl, and means operated thereby for taking up the slack, of a piston subject on one side to fluid under pressure for operating said pawl, a spring opposing the fluid pressure on the piston, latching means for preventing accidental reverse movement of the ratchet wheel, a manually operable means coupled for forward rotation with said ratchet wheel, and means responsive to manual reverse movement of the manually operable means for releasing the latching means to permit reverse movement of the ratchet wheel.

2. In a brake slack adjuster, the combination with a casing, a ratchet wheel and pawl disposed within the casing, and means operated thereby for taking up the slack, automatic means for actuating said pawl and ratchet wheel, a movable member coupled to said ratchet wheel, latching mechanism for latching the ratchet wheel to said casing to prevent accidental reverse movement of the ratchet wheel, and means responsive to a reverse movement of said movable member for unlatching the ratchet wheel to permit reverse movement thereof.

3. In an automatic slack adjuster for fluid pressure brakes, in combination, a casing, a ratchet wheel disposed within said casing, means operated by the wheel for taking up the slack, a piston and pawl mounted in the casing for operating the ratchet wheel, means for preventing the reverse movement of said ratchet wheel comprising an extension member mounted for rotation about the axis of said ratchet wheel, a latch member pivotally supported at one end to move with said ratchet wheel and adapted at the other end to engage teeth provided in the wall of the casing, a link pivotally supported at one end from said extension member and connected at the other end to a point intermediate the ends of the latch member, and biasing means for urging said pivotal supports toward each other to force the engaging end of the latch outwardly.

4. In an automatic slack adjuster for fluid pressure brakes, in combination, a casing, a ratchet nut disposed within said casing and terminating in a sleeve, an extension sleeve member mounted for rotation axially with said ratchet nut, means operated by the ratchet nut for taking up slack, and means for operating said ratchet nut, a sleeve member rotatably mounted adjacent said ratchet nut for rotation about the axis of said nut and extending outwardly through an opening in said casing, latching means for preventing accidental reverse movement of said ratchet nut and means responsive to manual reverse movement of said sleeve member for releasing the latching means to permit reverse movement of the ratchet nut.

5. In an automatic slack adjuster for fluid pressure brakes, in combination, a casing, a ratchet wheel disposed within said casing, means operated by the wheel for taking up slack, means for operating said wheel, a sleeve member axially aligned with said ratchet wheel and adapted to rotate therewith, latching means carried by said ratchet wheel for engaging teeth provided on the casing to prevent reverse movement of said ratchet wheel, and means responsive to a reverse movement of said sleeve for releasing said latch.

6. In a brake slack adjuster, the combination with a casing, a ratchet nut within the casing, automatic means for operating said ratchet nut, and means operated thereby for taking up the slack, of a sleeve extension positioned axially of said nut, a latch carried by said ratchet nut having a hooked portion adapted to engage teeth provided in the casing for latching said nut against reverse movement and an inwardly extending arm, a pair of lugs extending outwardly from said sleeve portion and positioned on opposite sides of said latch arm, biasing means between one of said lugs and said latch arm for normally biasing said latch into engagement with said teeth, said other lug being adapted upon a reverse movement of said sleeve to actuate said latch arm to disengage the latch from said teeth and permit a reverse movement of said ratchet nut.

7. In a brake slack adjuster, the combination with a ratchet nut, automatic means for operating said ratchet nut, and means operated thereby for taking up the slack, of a sleeve extension member separate from but coupled to rotate axially with said nut, latching means carried by said ratchet nut for locking said nut against reverse movement and means responsive to a reverse movement of said sleeve extension member for releasing said latching means to permit a reverse movement of said ratchet nut.

8. In a brake slack adjuster, the combination with a ratchet wheel and pawl and means operated thereby for taking up the slack, of a piston subject on one side to fluid under pressure for operating said pawl, a spring opposing the fluid pressure on the piston, latching means for preventing accidental reverse movement of the ratchet wheel, a manually operable means coupled to said ratchet wheel, and means responsive to manual movement of the manually operable means in either direction for releasing the latching means to permit movement of the ratchet wheel in a corresponding direction.

9. In a brake slack adjuster, the combination with a casing, a ratchet wheel and pawl disposed in the casing, and means operated thereby for taking up the slack, automatic means for actuating said pawl and ratchet wheel, a movable member coupled to said ratchet wheel, latching means for latching the ratchet wheel to said casing to prevent accidental reverse movement of the ratchet wheel, and means responsive to manual movement of said movable member in either direction for unlatching the ratchet wheel to permit movement thereof, said ratchet member being movable in either direction by said movable member.

10. In a brake slack adjuster, the combination with a ratchet nut, automatic means for operating said ratchet nut, and means operated thereby for taking up the slack, of a sleeve extension member separate from but coupled to rotate axially with said nut, latching means carried by said ratchet nut for locking said nut against reverse movement, and means responsive to movement of said sleeve extension member in either direction for releasing said latching means to permit movement of said ratchet nut by said sleeve extension member in a corresponding direction.

FREDERICK G. WILLIAMSON.